ved February 15, 1921.

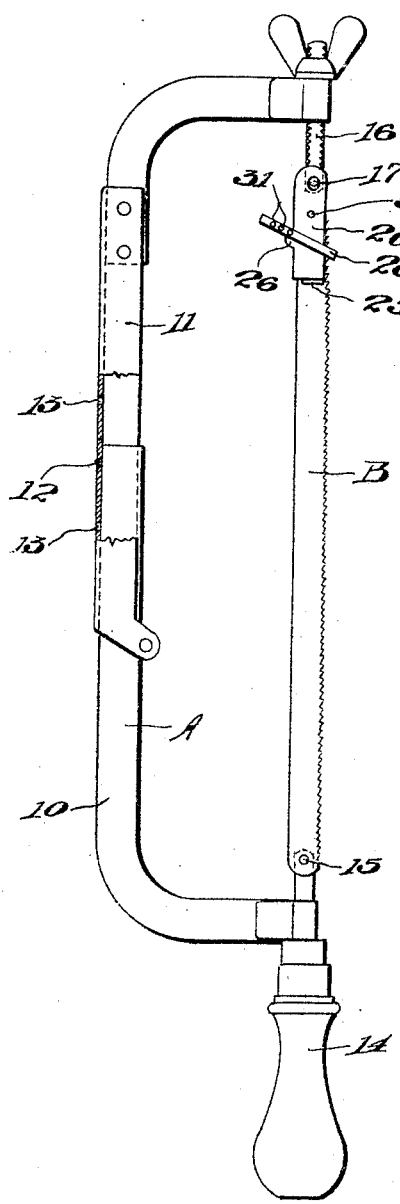

UNITED STATES PATENT OFFICE.

WILLIAM J. McQUILLAN, OF PITTSBURGH, PENNSYLVANIA.

HOLDER FOR SAW-BLADES.

1,368,638.

Specification of Letters Patent.  Patented Feb. 15, 1921.

Application filed May 29, 1919. Serial No. 300,524.

*To all whom it may concern:*

Be it known that I, WILLIAM J. McQUILLAN, a citizen of the United States, residing at Pittsburgh, in the county of Allegheny and State of Pennsylvania, have invented certain new and useful Improvements in Holders for Saw-Blades, of which the following is a specification.

This invention relates to a holder for saw blades, particularly designed for use in connection with hack saws and an object of the invention is to provide a device by means of which a hack saw blade, in case it becomes broken, may be quickly and easily attached to the handle of the hack saw for use therewith, eliminating the necessity of drilling a hole in the broken end of the saw blade for fitting the damaged end of the handle of the saw.

Another object of this invention is to provide a saw blade holder which is simple in construction and is adaptable for attachment to saw blades of different widths.

Other objects of the invention will appear in the following detailed description taken in connection with the accompanying drawings forming a part of this specification and in which drawing:

Figure 1 is a side elevation, partly in section of a hack saw showing the improved blade holder connected thereto.

Fig. 2 is a side elevation of the improved blade holder showing it attached to the end of a saw blade.

Fig. 3 is a longitudinal section through the blade holder attached to a saw blade.

Fig. 4 is a top plan of the blade holder.

Fig. 5 is a bottom plan of the blade holder, and

Fig. 6 is a longitudinal section through a modified form of the blade holder.

Referring more particularly to the drawing, A indicates an approved type of hack saw structure which is adjustable as to length comprising sections 10 and 11, adjustably connected and held in various adjusted positions by the insertion of a pin 12 through any one of the openings 13 formed in the receiving section 11 of the hack saw. The section 10 carries the usual handle or hand grip 14 upon the inner free end of which the blade engaging pin 15 is mounted, while the section 11 carries the adjustable screw 16 upon the inner end of which is mounted the transversely extending saw blade engaging pin 17.

The blade holder, generally indicated by the numeral 20 which is adapted for use with broken blades for connecting the broken blades to the handle structure A comprises the main body preferably formed of a single piece of sheet metal bent intermediate its ends to provide parallel side portions 21 and 22, adapted to engage one upon each side of a saw blade B adjacent the broken end of the blade as clearly shown in Figs. 3 and 5 of the drawings. The outer end portions of the parallel sides 21 and 22 are hammered to lie in facial abutment with each other and may be welded together if desired, as shown at 23, and these engaging end portions are provided with alining openings 24 adapted to receive either of the pins 15 or 17 therethrough for connecting the blade holder 20 to the saw handle structure. The inner end of the sides 21 and 22 are bent outwardly to form leads or guards 25 at the inner end of the holder 20.

An upstanding lug 26 is formed on the back of the holder and presents a straight shoulder toward the outer end of the holder, against which shoulder a pin 27 is adapted to rest when the holder is attached to a saw blade. The pin 27 extends transversely through the saw tooth gripping member or loop 28 which is preferably rectangular in shape and is provided with an opening through which the body of the holder 20 extends. The lower cross piece 29 of the member 28 engages against the angle side of one of the teeth of the saw blade B as shown in Fig. 3 of the drawings, so that any pull longitudinally on the saw blade away from the holder would tend to securely clamp this cross piece 29 against one of the teeth of the saw blades and the pin 27 against the straight shoulder of the lug 26.

A pin 30 is inserted transversely through the body of the blade holder 20 to prevent the rectangular gripping member 28 from accidentally moving off the body of the holder. The sides of the rectangular member 28 are provided with a plurality of spaced openings 31 any alining pair of which are adapted to engage the pin 27 to adjust the active length of the gripping member 28 to fit the saw blades of different widths.

In Fig. 6 of the drawings, a modified form of the loop is shown which is not variable for use upon saw blades of different width. In this modified form, the rectangular gripping member or loop is designated by the numeral 28ª, and 28ª is of such length that when it is in its proper angular position so that its lower portion 29ª will fit against one of the angled sides of one of the teeth of the saw blade B, the upper cross piece of the body will firmly seat against the straight shoulder of the lug 26ª formed upon the back or the body 20ª of the holder. This body 20ª is constructed in a similar manner to the body of the holder 20 and is provided with a transversely extending pin 30ª to prevent the rectangular gripping member 28ª from moving off the body. The side walls of the body of the holder are adapted to snugly fit the sides of the saw blades so as to form a brace for the same and thus prevent the buckling thereof when in use and the holder is formed with a less width than the saw blades with which the same is to be used, so as to permit of the lower edges of the saw blades to be freely exposed. However the holder is made sufficiently wide so as to embrace the major part of the width of the saw blade so that a sufficient brace will be provided for the same.

In use; when a saw blade B breaks, which quite frequently happens during use of hack saws, the broken end of the blade is inserted between the spaced sides 21 and 22 of the blade holder 20, and the pin 27 is adjusted to properly fit the width of the blade B and the holder 20 is connected to the handle structure A by inserting either the pin 15 or 17, depending upon the end of the blade which has been broken, through the opening 24.

Changes in details may be made without departing from the spirit of this invention; but,

I claim:

1. In a saw blade holder, the combination of a body comprising a pair of spaced side plates adapted to receive the end of a saw blade therebetween, a lug formed upon the back of said body, a rectangular gripping member mounted over said body and adapted to bind against said lug and one tooth of a saw blade, a pin extending transversely through the body to prevent accidental movement of said gripping member off the body, said rectangular gripping member provided with a plurality of spaced openings, a pin adapted to be inserted through any of said openings for regulating the active length of the gripping member.

2. In a saw blade holder, the combination of a body comprising a pair of spaced side plates adapted to receive the end of the saw blade therebetween, a lug formed upon the back of said body, a rectangular gripping member mounted over said body and adapted to bind against said lug and one tooth of a saw blade, a pin extending transversely through the body to prevent accidental movement of said gripping member off the body, said rectangular gripping member provided with a plurality of spaced openings, a pin adapted to be inserted through any of said openings for regulating the active length of the gripping member, the outer ends of said side plates being bent to lie in facial abutment and provided with an opening adapted for connection with a saw handle.

3. In a saw blade holder the combination of a body comprising a pair of spaced side plates adapted to receive the end of the saw blade therebetween, a lug formed upon the back of said body, a rectangular gripping member mounted over said body and adapted to bind against said lug and one tooth of a saw blade, a pin extending transversely through the body to prevent accidental movement of said gripping member off the body, said rectangular gripping member provided with a plurality of spaced openings, a pin adapted to be inserted through any of said openings for regulating the active length of the gripping member, the outer ends of said side plates being bent to lie in facial abutment and provided with an opening adapted for connection with a saw handle, the inner ends of said side plates being bent outwardly.

4. As a new article of manufacture, a saw blade holder comprising a body U-shaped in cross section and closely fitting the sides of the blade and extending throughout the greater part of the width of the blade to hold it flat, yet sufficiently narrower than the blade to fully expose the teeth at the open side of the holder, and having a lug formed on the bight portion thereof, and a rectangular gripping frame mounted over said body and arranged to engage said lug and to extend below the open portion of said body.

WILLIAM J. McQUILLAN.